US005258925A

United States Patent [19]

Maier et al.

[11] Patent Number: 5,258,925

[45] Date of Patent: Nov. 2, 1993

[54] PRINTING PROCESS DIAGNOSTIC METHOD AND SYSTEM FOR A ROTARY PRINTING PRESS, USING DIFFUSE REFLECTION OF SOLID-PRINT AND HALF-TONE FIELDS

[75] Inventors: Werner Maier, Augsburg; Hans Mamberer, Königsbrunn; Armin Weichmann, Kissing, all of Fed. Rep. of Germany

[73] Assignee: MAN Roland Druckmaschinen AG, Offenbach am Main, Fed. Rep. of Germany

[21] Appl. No.: 650,739

[22] Filed: Feb. 5, 1991

[30] Foreign Application Priority Data

Feb. 22, 1990 [DE] Fed. Rep. of Germany ....... 4005558

[51] Int. Cl.[5] ............................................. G06F 15/20

[52] U.S. Cl. ............................... 364/526; 364/551.01

[58] Field of Search ........... 364/526, 578, 525, 551.01; 356/402, 407; 101/141, 142, 365

[56] References Cited

U.S. PATENT DOCUMENTS

| | | | |
|---|---|---|---|
| 3,234,871 | 2/1966 | Ostwald | 101/142 |
| 4,197,584 | 3/1980 | Blazek | 364/551.01 |
| 4,561,103 | 12/1985 | Horiguchi et al. | 364/551.01 |
| 4,649,502 | 3/1987 | Keller et al. | 364/551.01 |
| 4,881,182 | 11/1989 | Hank et al. | 101/365 |
| 4,901,254 | 2/1990 | Dolezalek et al. | 364/526 |
| 4,967,379 | 10/1990 | Ott | 364/526 |
| 5,023,812 | 6/1991 | Pfeiffer | 364/526 |
| 5,068,810 | 11/1991 | Ott | 101/365 |
| 5,069,124 | 12/1991 | Schneider | 101/142 |
| 5,122,977 | 6/1992 | Pfeiffer | 364/526 |

FOREIGN PATENT DOCUMENTS

| | | |
|---|---|---|
| 0012723 | 6/1980 | European Pat. Off. . |
| 0311991 | 4/1989 | European Pat. Off. . |
| 3140760 | 8/1982 | Fed. Rep. of Germany . |
| 2386083 | 10/1978 | France . |
| 2066949 | 7/1981 | United Kingdom . |

OTHER PUBLICATIONS

Advances in Printing Science and Technology; Pentech Press pp. 207-227.

*Primary Examiner*—Jack B. Harvey
*Assistant Examiner*—Ellis B. Ramirez
*Attorney, Agent, or Firm*—Frishauf, Holtz, Goodman & Woodward

[57] ABSTRACT

A method for detecting diffuse reflections of full-tone and half-tone fields in order to prepare diagnoses on problem factors and/or changes in process parameters, such as blurring, dampness, machine temperature. During printing, the diffuse reflections of the full-tone and half-tone fields are detected with scanners. This is done in such a way that for at least two printed copies, in at least two fields of each copy, the diffuse reflections of full-tone and half-tone areas, or of at least two half-tone fields of different area coverages are compared, and based on the results of this comparison, diagnoses and/or control recommendations are made.

21 Claims, 4 Drawing Sheets

FIG. 1a
FIG. 1b
FIG. 1c
FIG. 1d
FIG. 1e
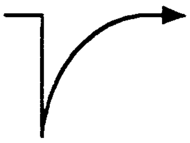
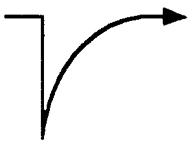
FIG. 1f
FIG. 1g
FIG. 1h
FIG. 1i
FIG. 1j

PRINTING PROCESS DIAGNOSTIC METHOD AND SYSTEM FOR A ROTARY PRINTING PRESS, USING DIFFUSE REFLECTION OF SOLID-PRINT AND HALF-TONE FIELDS

FIELD OF THE INVENTION

The invention relates to a method for detecting diffuse reflections of solid-printed and half-tone fields in order to diagnose the changes required to be made in process parameters, such as damping liquid metering, machine temperature and blurring (or mackling, or non-uniform printing or doubling) for rotary printing presses, and systems for performing the method.

More particularly, a method is disclosed for detecting diffuse reflections of full-tone and half-tone fields, and for preparing diagnoses based on the variations in process parameters, which are sensed by sensing means and by scanners integrated in said printing press. The various process parameters include damping liquid metering, machine temperature, blurring (doubling, mackling, or non-uniform printing) for rotary printing presses. The steps in the method of the present invention includes detecting the diffuse reflections of full-tone and a half-tone field, or of two half-tone fields during printing with said scanners; comparing in the detected reflections for at least two printing copies the respective diffuse reflections of the selected fields including at least one half-tone field. The selected fields are taken of different area coverage. From the compared reflections, a diagnosis of printing press operation can be obtained. If it is determined that the press is not printing as desired, then the diagnosis can be used to control the process parameter to adjust the rotary printing press to operate in the normal or desired range.

BACKGROUND

It is generally known that the printed copies produced by rotary printing presses, in particular offset rotary printing presses, present a printed impression that depends on the structure of the material to be printed, the structure or composition of the printing ink, and the layer thickness on the material to be printed, the ink areas or dots on the material to be printed, the type of light source illuminating the printing, and on the surroundings of the printed area observed In the prior art, process problems, and in particular deviations, occurred between the command values and actual values (sensed in the printer) for the ink. These prior art systems included automatic regulating systems which relied solely on zonal variation of the ink metering, or variation of the ink ductor parameters for control. For instance, by measuring the diffuse reflections, ink layer thickness changes can be ascertained and can be corrected by changing the ink metering. However, merely changing the ink metering, in turn changes the balance between the ink and the damping liquid. Changing the ink and damping liquid balance, in turn, causes an additional change in the diffuse reflections. If only the ink metering is changed, this causes a change in the extent of contrast in the printed image. Accordingly it would be better to make an additional correction in the damping liquid metering in order to restore the previously existing balance between the ink and damping liquid. Problems that can be ascertained by measurement of diffuse reflection are particularly critical and cannot be eliminated by either changing the ink metering or by changing the damping liquid metering; examples of these are slipping and blurring.

In the prior art detecting diffuse reflection values after printing had significant problems. The prior art cannot evaluate the various behaviors of the diffuse reflections of solidly printed fields and half-tone fields, and half-tone areas of varying area coverage nor can the prior art calculate current regulating recommendations or provide diagnosis data, because other factors such as the actual printing history (or, in other words, the course of development of the measurement data) was not known accurately enough, and could not be currently evaluated.

THE INVENTION

An object of the present invention is to provide a method and apparatus in which a current diagnosis is possible, and optionally in which some regulation is possible.

Briefly, a method is provided for detecting diffuse reflections of full-tone and half-tone fields, sensed by scanners integrated in the printing press. Parameters, which include damping liquid metering, machine temperature and the like, which result in blurring or abnormal, undesired printing, can then be changed.

In accordance with the invention, the diffuse reflection of a full-tone and a half-tone field, or of at least two half-tone fields of different area coverage, are detected on sequentially printed copies and compared. The sequential copies may follow each other directly, or may follow each other with intervening copies, that is, may follow each other in a spaced sequence. From the compared reflections, a diagnosis is obtained if printing condition parameters or machine operating parameters should be changed, that is, whether the rotary printing press is operating normally and is desired, or not. If the printing press is not operating normally or as desired, then the diagnosis can be used as the basis to control the printing process parameters and to adjust the rotary printing press to operate normally, that is, as desired.

The present invention is based on the recognition that there is no proportional relationship between the change in diffuse reflections of half-tone and solid areas within an ink zone, when considered throughout the printing of an edition. It was found, in particular, that the diffuse reflections of half-tone areas can vary, even though the diffuse reflections of the solidly printed areas remain constant. The cause for this effect clearly results from the different reaction of half-tone and solid areas to changes in the printing process parameters. Thus, sensing the difference between the diffuse reflections from solid areas and half-tone fields in succeeding copies, and detecting the changes of the difference, also provides control information.

The invention is also based on the recognition that changes in parameters which bring about a slow change in ink transfer, for example, changes in the machine temperature, have an effect, as a trend, on the diffuse reflection of the ink over the course of the printing of an edition. Changes in a parameter that cause a brief major change in ink transfer have an effect of shifting the level of the diffuse reflections of the ink (slip adjustment). Changes in parameters that cause a change in the ink and damping liquid balance also indirectly cause a change in ink transfer, because the ink transfer depends, among other factors, on the status of the ink/water emulsion. If there is a constant ink transfer at a stable ink and damping liquid balance, then the fluctuations in diffuse reflections of the ink have a standard distribution, in the statistical sense, over the course of the printing of an edition. If there is a deviation from standard distribution, then a process problem is involved.

The invention relates in particular to problems in ink diffuse reflection processes that cannot be corrected by changing the ink metering or the damping medium metering which arise as a result of register shifts, web tension fluctuations with certain frequencies, machine vibration and oscillations and temperature changes.

According to the present invention, if a problem is ascertained that cannot be eliminated, in a known, conventional manner, for instance one that cannot be overcome by ink and/or damping liquid correction, then the regulating circuit for the ink and damping liquid correction is preferably deactivated for the duration of the problem. If the problem is one that can be corrected by a change in the ink and/or damping liquid, a suitable regulation is performed.

DRAWINGS

FIG. 1 collectively schematically shows the effects of changes or interruptions in ink flow and blurring processes in half-tone and full-tone fields, wherein FIGS. 1*a* and 1*b* show ink flow changes;

FIGS. 1*c* and 1*d* show faster ink flow changes than FIGS. 1*a* and 1*b;*

FIGS. 1*e* and 1*f* show the effect of ink flow interruption;

FIGS. 1*g* and 1*h* show the effect of long-term blurring;

FIGS. 1*i* and 1*j* show the effect of brief blurring;

DETAILED DESCRIPTION

Figure 2:
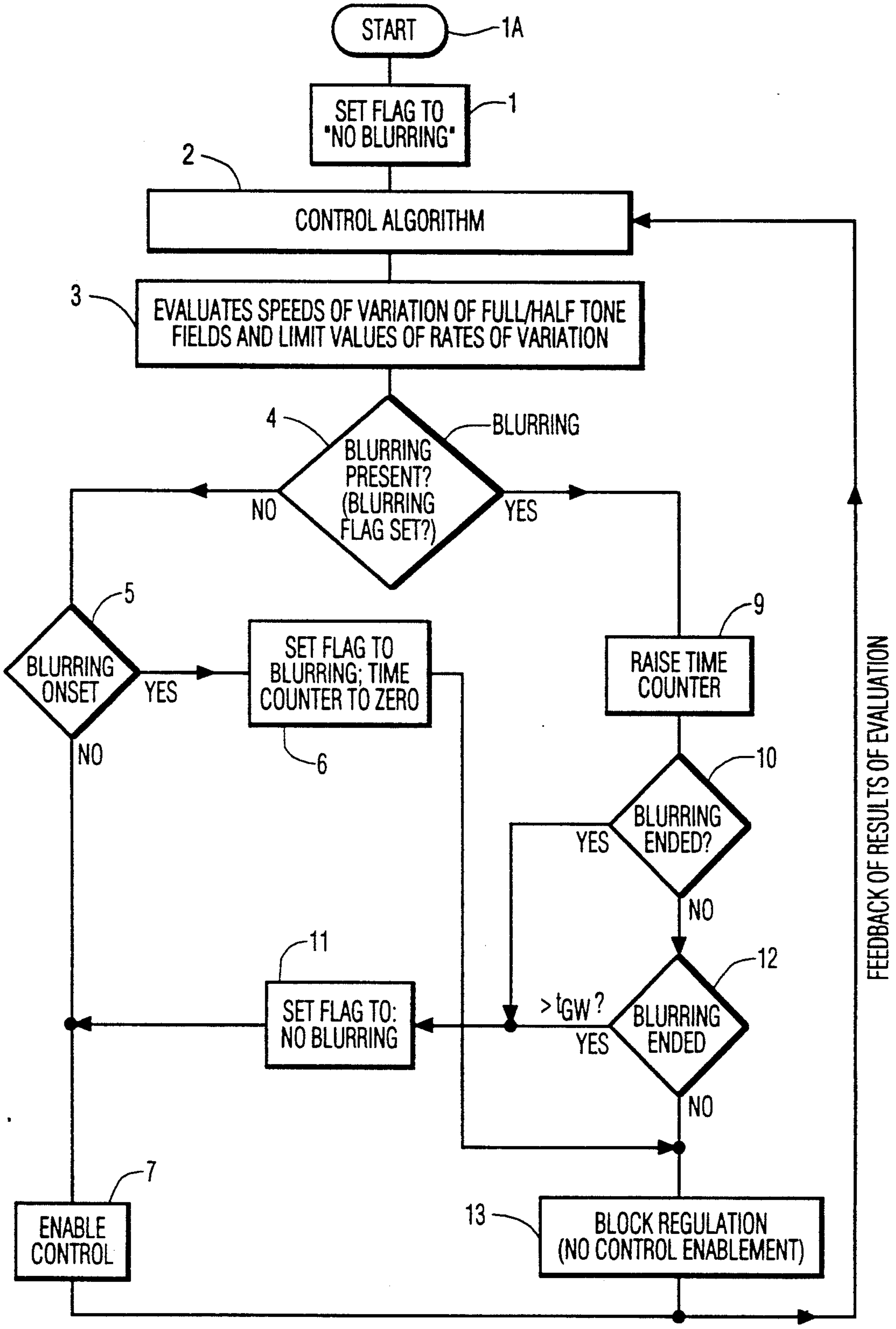
FIG. 2 is a flow chart to explain the method according to the invention to ascertain blurring.

In the scope of the present invention, with the methods described below, process problems are detected from the diffuse reflection values of selected half-tone values and full-tone field values; these values can also be used to regulate the ink delivery. For half-tone fields, fields with 75% to 80% of the area covered are preferably used. However, half-tone fields with varying area coverage can also be used. Thus, it becomes unnecessary to use additional control fields and sensors.

It is also within the scope of the present invention to evaluate the printed copies, that is, the images printed on a sheet or web, "on line", that is, in the machine. With the recognition that process problems cause a change in the diffuse reflection values in the control fields that is greater than or deviates from the standard-distribution process fluctuations, process problems can also be recognized chronologically, preferably by the rate of the change, which is calculated from the diffuse reflections of the test fields The problems ascertained according to the present invention are coordinated via test rules that place the successively occurring density patterns of half-tone and full-tone fields in relation to one another so that conclusions can be drawn as to the particular sources of the problems A slow change in ink flow represents a trend-type change and is shown in FIG. 1*a* and FIG. 1*b.* These changes have the same effect on the diffuse reflections in the half-tone and the full-tone field and is caused for instance by changes in the machine temperature.

A rapid ink flow change is shown in FIG. 1*c* and FIG. 1*d,* and once again such a changes makes itself felt in the same way, but with a substantially greater rate of change in the diffuse reflection of the half-tone and full-tone fields.

FIG. 1*e* and FIG. 1*f* show respectively a typical pattern of diffuse reflection changes of full-tone and half-tone fields during an ink flow interruption.

FIG. 1*g* shows the pattern of a diffuse reflection for the half-tone field, as can occur in the event of long-term blurring; FIG. 1*h* shows a diffuse reflection pattern for a full-tone field, which remains virtually unchanged during long-term blurring.

FIG. 1*i* shows the pattern for a diffuse reflection for brief blurring, that is, for a half-tone field. FIG. 1*j* shows a diffuse reflection pattern for a full-tone field. FIG. 1*j* also shows that during blurring, no decrease in diffuse reflection can be ascertained in the full-tone field, while a marked decrease in diffuse reflection can be ascertained in the half-tone field (FIG. 1*i*). This marked decrease is abrupt in brief blurring, and ceases virtually equally abruptly (i.e. it is caused by an exponential function with a small time constant).

In the preferred embodiment of this invention described previously, the mathematical relationships and definitions listed in the Table appearing at the end of the description of the present invention have been found to apply.

aa) slow variation in ink flow (i.e.. trend) FIGS. 1*a.* and 1*b*) — affects diffuse reflection of half-tone and full- tone fields —

See Table Equation 1

(ab) fast variation in ink flow (i.e.. level shift) FIGS. 1*c* and 1*d*)

— affects diffuse reflection of the half-tone and full-tone fields —

See Table Equation 2 ac) ink flow interruption (stoppage) (FIGS. 1*e* and 1*f*)

— affects diffuse reflection of half-tone and full-tone fields —

See Table Equation 3

(ba) long-term (doubling) blurring (FIGS. 1*g* and 1*h*)

— affects diffuse reflection of the half-tone fields substantially more strongly than the full-tone fields —

See Table Equation 4 bb) brief blurring (doubling) (FIGS. 1*i* and 1*h*)

—affects diffuse reflection of the half-tone fields substantially more strongly than the full-tone fields —

See Table Equation 5 ca) The rate of variation (G) of the full to the half-tone or (V/R) is calculated for instance:

See Table Equation 6 where K is the number of the current sheet counted from the onset of printing.

cb) The difference between the rates of variation of the half-tone and full-tone fields is then obtained for instance by:

See Table Equation 7

The definition $G_{V/R}$ in Equation (6) is to be understood as an example; other scanning sequences, for instance for every other or every third or fifth sheet, and other linking rules, which put more than two sheets in relation with one another, for instance, are also possible.

Limit values (1) and (2) as noted above are first ascertained empirically. However, they may also be ascertained by a self-learning system in accordance with a combination of parameters and stored in memory.

Process problems have been recognized in the present invention from changes in rate, and from this a diagnosis and/or adjustment regulations can be found. However, within the scope of the present invention, it is also possible by means of trend analysis to make a calculation, in advance, of the values for the diffuse reflection to be expected. This trend analysis takes into account the measured value of a relatively large number of downstream sheets (in general, n downstream sheets, where n is a natural number, for instance n =100, 1000). This prediction is made with the aid of functions that describe the relationships between the process parameters mathematically and that include knowledge as to the method used and the machine. With the aid of the downstream measured values, the subsequent or upstream measured values can then be extrapolated. A problem exists whenever the measured values do not match the previously calculated ones, even within given tolerances. The tolerance limits in the method of the present invention are specified at the beginning, or calculated from statistical evaluations of n measured values for each stable process segment and thus adapted in the course of the printing of an edition. The inaccuracy of the prediction also becomes part of the tolerances.

This type of problem measurement improves, the more accurately it is known how the diffuse reflections of the full and half-tone fields vary as a function of the ink and/or damping liquid metering and as a function of the influence of the various other problem variables.

With the aid of the tolerances and the values thus calculated and to be expected, process problems that cannot be ascribed to ink and/or damping liquid metering can be ascertained. The accuracy of prediction, like the tolerance limits, can also be improved in the course of printing an edition if the response to the changes in the machine parameters during printing is analyzed, and the specified functional relationships are optimized in accordance with actual prevailing conditions in the printer.

Preferably, it is within the scope of the present invention that a distinction can be made between the setup (initial printing) phase and the continued printing phase. The methods shown for recognizing process problems are preferably applicable to the continued printing phase, in other words once the command diffuse reflection valves have at least approximately been attained. For the initial printing or setup phase, the strategy of the invention can be used only to a limited extent, because the causes of problems are often superimposed on one another, so that differentiated evaluation of the diffuse reflections in the control fields cannot always be done. It is also within the scope of the present invention that the limit values in the setup phase should therefore be increased, so that only major problems can be recognized and intercepted. For the setup phase, however, a general control enablement equation is preferably used up to a defining diffuse reflection value $R_r$:

$$R_{min}=R_s-dR$$

below the command diffuse reflection $R_s$. This is restricted only in the sense that the damping liquid metering must be monitored and adjusted if the diffuse reflections of the full-tone and half-tone fields vary in their relationship to one another outside a tolerance range GWf, because without an approximately correct metering of damping liquid, control of the ink management is not very practical.

Within the scope of the invention, there are various ways of setting the gradients of the half-tone and the associated full-tone fields in relationship with one another in the gradient method (that is, evaluation of the rates of change), and for establishing the slopes (derivation as a function of time) of the trend functions of the half and full-tone fields in relation to one another. The basis for linking the rate of change or slopes of the trend functions can be subtraction, division, etc., or differences in the percentage-wise deviations of various test fields. More complicated relationships, however, may also be used and evaluated.

Diffuse reflection measurement can be done in the form of color density measurement, or colorimetric measurement, or preferably spectral measurement. The evaluation of the spectral measurements can then be done by densitometry and/or colorimetry and/or by other criteria, such as the variation in diffuse reflections in particularly critical wavelength ranges.

Especially in job printng, it was found in the present invention that blurring has a major effect in the diffuse reflection of half-tone fields, but has practically no effect in the diffuse reflection of full-tone fields. According to the present invention, the variation of the diffuse reflection in the full-tone and half-tone fields is therefore compared to recognize blurring. If the half-tone diffuse reflection suddenly decreases sharply or is below specified tolerances that are dependent on the instantaneous diffuse reflection, while the full-tone diffuse reflection varies virtually not at all, then blurring is highly likely to be present. Equally, if the end of blurring occurs once this decrease in the half-tone no longer exists, yet without a corresponding simultaneous increase in the full-tone diffuse reflection, then blurring is highly likely to be present.

The present invention also offers a way to visually indicate the disruption of the balance between ink and damping liquid. On the precondition according to the present invention, that even a variation in the damping liquid metering has an effect on a variation of diffuse reflection in the half-tone fields, and does so more sharply on the diffuse reflection of the full-tone fields, a criterion for ink regulation can be derived from this. To this end it is sufficient to monitor the diffuse reflection of the full-tone fields in the individual colors once per sheet, or at an interval of 4 or 5 zones. With certain limit values, the damping liquid metering should then be regulated, or the warning "monitor damping liquid metering" should be issued (however, since this problem differs only slightly from others caused for instance by fluctuations in web tension, the measurement of other parameters increases the reliability of the diagnosis). The comparison of the diffuse reflection of full-tone and half-tone fields, however, makes it possible at least to differentiate between problem in ink and damping liquid balance compared with blurring, because the full-tone diffuse reflection varies as well in the first case, while in the second case it remains virtually the same while there is a marked decrease in half-tone diffuse reflection The principles explained above for recognizing problems are ascertained individually for each color, independently of the other colors. Detecting problems for each inking mechanism and differentiating them requires that they must be performed separately for each color. The combination of the data for each color with data obtained by means of measurement of fields having a plurality of colors printed on top of one another, for example in the gray balance, can provide information on ink acceptance fluctuations. The combination of the values for the individual colors alone enables some predictions to be made. Ink flow changes in individual inking mechanisms that arise from changes in the inking mechanisms for previously printed colors can also be analyzed.

With the present invention, monitoring of blurring (i.e. mackling, or doubling) can be performed without additional test fields. To monitor damping liquid, full-tone test fields of the individual colors at intervals of four or five zones will suffice. The printing monitor strip must accordingly preferably have four half-tone test fields per zone for the individual colors (diffuse reflections), one monitoring field for the gray balance field (color measurement) and one full-tone field for the individual colors (diffuse reflection, or as a substitute have monitoring marks for track scanning or cycling scanning).

For further explanation of the present invention, two different possible procedures will be described in two flow charts shown in FIGS. 2 and 3, for performing the method according to the present invention.

Figure 3:
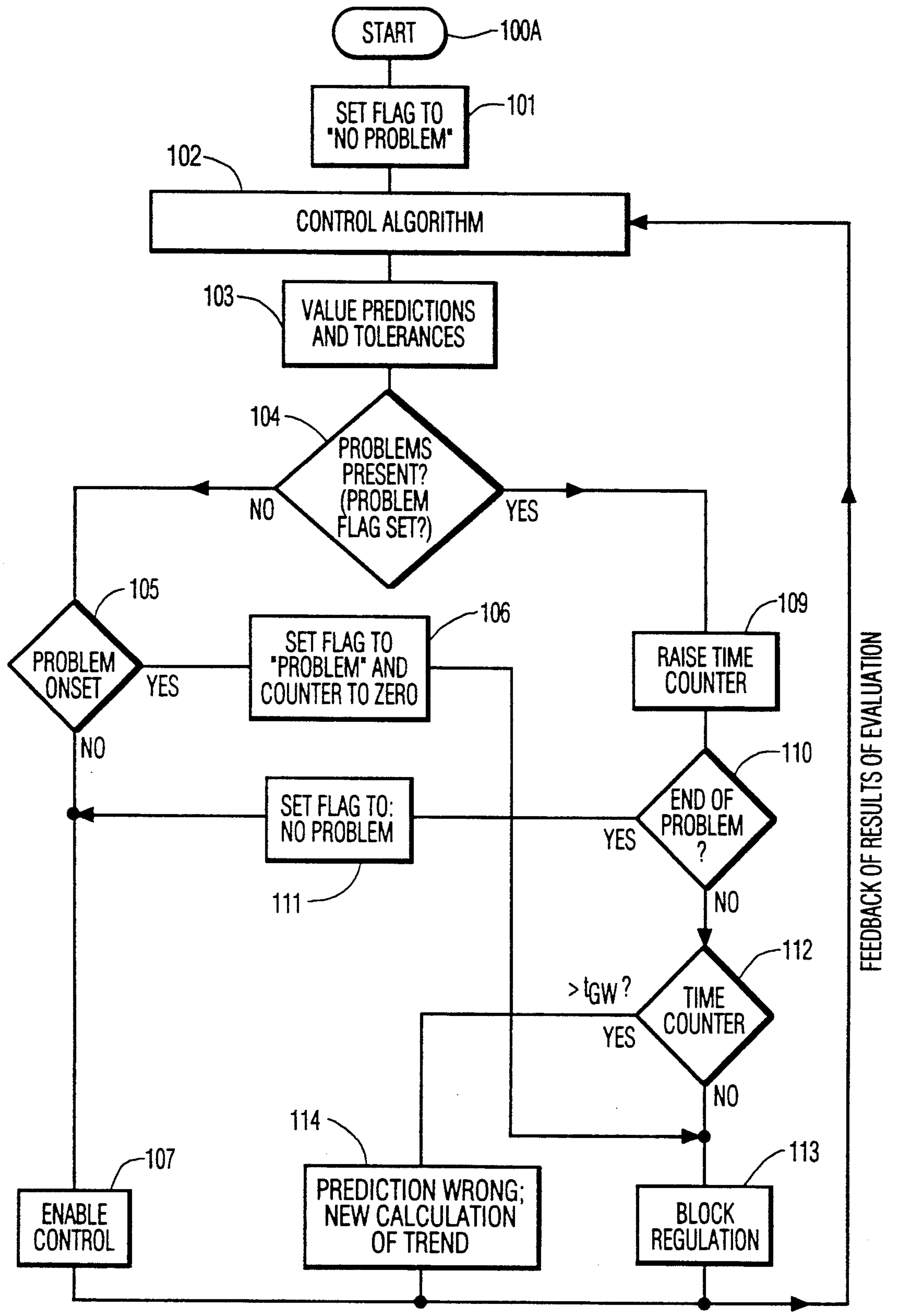
FIG. 3 is a flow chart to explain problem finding, or trouble shooting.

BLURRING MONITORING BY EVALUATION OF THE RATE OF VARIATION EXPLANATION OF THE FLOW CHART FOR EVALUATING THE RATE OF variation (FIG. 2)

Step 1: At the start (Block 1A), the basic state "no blurring" is assumed as indicated in Step (Block) 1.

Step 2: The control algorithm (stored in Block 2) includes among other terms: the diffuse reflections of the individual color half-tone fields and individual color full-tone fields as input values. It also performs the required control after enablement by Step (Block) 7.

Step 3: The control algorithm calculates the rates of change for the full and half tones, or the difference between the rates of change (see Table, equations 6 and 7) and furnishes to Step (Block) 3 a limit value above which a problem exists, as well as the maximum duration of blurring (printed copies).

Step 4: The "blurring"/"no blurring" indication at Step (Block) 4 is evaluated. If it points to "blurring", then the process moves to Step (Block) 9; if it points to the normal state, "no blurring", then an indication is sent to Step (Block) 5.

Step 5: A check is made at Step (Block) 5 as to whether an onset of blurring exists by determining:

(a) Is the rate of variation (G) greater than the limit value? or (b) Is the difference in rates of variation (Table, equation 7) ($G_{diff}$) greater than the limit value?

Step 6: If an onset of blurring is ascertained in Step 6 (at Block 6), the flag must be moved to "blurring".

Step 7: If blurring is not occurring, then the enablement for control is effected for the control algorithm in Step (Block) 7 which is fed back to Step (Block) 2.

Step 8: The control commands of the control algorithm in Step (Block) 2 can then be performed.

Step 9: If blurring was already present (if Step 4 is YES), the time counter at Step (Block) 9 should be increased.

Step 10: A check should then be made in Step (Block) 10 as to whether the end of blurring is present as follows (where * is a function value such as addition, division, etc.)

Test: (−1) * greater than the limit value? or

Test: (−1) * $G_{diff}$ greater than the limit value?

Step 11: If the end of blurring is recognized in Step (Block) 10, the flag for Block 11 is positioned on "no blurring" and the output of Block 10 is sent directly to Step (Block) 12.

Step 12: If no end of blurring was recognized in Step (Block) 10, then a check is made as to whether a maximum duration $t_{max}$ has been exceeded. If so, Step (Block) 10 jumps to Step (Block) 11: that is, after a maximum time of blurring, an OK report, "no blurring", is again issued.

Step 13: As long as the flag in Step (Block) 12 is set to "blurring", the control circuit 13 indicates that the measured values must not be used for calculating the command value.

Flag at Block 13 = "blurring" —> no control enablement, measured values in error!

PROBLEM RECOGNITION (FOR INSTANCE BLURRING MONITORING) with trend analysis

EXPLANATION OF THE FLOW CHART FOR TREND ANALYSIS FIG. 3

Step 100/101: At the start Step (Block) 100A is in the basic state: "no problem" is assumed.

The flag = "no problem" is set in Step (Block) 101.

Step 102: Among other terms, the control algorith Step (Block) 102 receives the diffuse reflections of the individual color half-tone fields and individual color full-tone fields as input values. The Block 102 algorithm includes the functional relationships between the variation of machine parameters, such as ink metering or damping liquid metering, and the resultant changes in diffuse reflections of the full or half-tone fields from stored values. The Block 102 algorithm also knows the tolerances of these diffuse reflections, in other words, the normal fluctuations of the values in continued printing from stored values. The stored vlues can be determined on the basis of values arrived at empirically, or on the basis of statistical evaluations of the measured values of a sufficiently long undisturbed period of continued printing. On the basis of these relationships, the algorithm can calculate a prediction of the course of the diffuse reflections. This entails a certain uncertainty, upon which the normal statistical fluctuations are superimposed.

Step 103: The control algorithm in Block 102 calculates the predictated diffuse reflection values, or the linking of the diffuse reflection values of the full and half-tones. Step 102 (Block 102) also furnishes a tolerance range for the diffuse reflection values, and if this range is exceeded, then factors not taken into account have occurred; in other words, a problem exists. These predictions and tolerance predictions are supplied to Step (Block) 103. It also furnishes a maximum duration of the problem beyond which a check and recalculation of the trande ($t_{max}$ in printing copies) is necessary.

Step 104: The flag "problem/no problem" is evaluated in Step (Block) 104. If a problem exists, the process jumps to Step (Block) 109; if Step (Block) 104 indicates a normal state, "no problem", the algorithm proceeds to Step (Block) 105.

Step 105: A check is made in Step (Block) 105 as to whether an onset of a problem is present, in other words, if two successive measured values are outside the tolerance range, as follows:

$$|R_V(i-1)-RV_V(i-1)>T_V \text{ and } |R_V(i)-RV_V(i-1)|>T_V \text{ and}$$

$$|R_R(i)-RV_R(i)|>T_R \text{ and } |R_R(i)-RV_R(i-1)|>T_R?$$

or $$|R_V(i-1)-RV_V(i-1))(*)(R_R(i-1)-RV_R(i-1))|>T \text{ and}$$

$$|R_V(i)-RV_V(i))(*)(R_R(i)-RV_R(i))|>T?$$

where:

- $R_V(i)$: full-tone diffuse reflection of the ith printed copy
- $R_R(i)$: half-tone diffuse reflection of the ith printed copy
- $RV_V(i)$: predicted value of the full-tone diffuse reflection of the ith printed copy
- $RV_R(i)$: predicted value of the half-tone diffuse reflection of the ith printed copy
- $T_V$: limit value of the deviation from the predicted value in full-tone
- $T_R$: limit value of the deviation from the predicted value in half-tone
- T: limit value for the differences between the deviations of the predicted values for the half and full tone
- (*): linking of the values, stands for instance for "−", "/" (i.e., subtraction, division, multiplication, addition, etc.)

Step 106: If an onset of a problem is ascertained in Step (Block) 105, the flag must be moved to "problem" and the process moves to Step (Block) 106.

Step 107: If a problem is not occurring in Step (Block) 105, then the enablement in Step (Block) 107 occurs and is fed back to the control algorithm (Step 102): The flag in Block 107 is set to "no problem" 13 >control enablement in Step (Block) 107.

Step 108: The control commands of the control algorithm Step 102 can then be performed in Step (Block) 102 upon receipt of the "no problem" indication from Step 107.

Step 109: If a problem was already present in Step (Block) 104, the time counter Step (Block) 109 should be increased.

Step 110: A check should then be made in Step (Block) 110 as to whether the end of the problem is present as determined by:

$$|R_V(i)-RV_V|>T_V \text{ and } |R_R(i)-RV_R|>T_R?$$

or $$|(R_V(i)-RV_V)(*)(R_R(i)-RV_R)|>T?$$

Step 111: If the end of a problem is recognized in Step (Block) 110, the flag is positioned on "no problem" and the process indication jumps to Step (Block) 112.

Step 112: If no end of the problem was recognized in Step (Block) 110, then a check is madse in Step (Block) 112 as to whether a maximum duration $t_{max}$ has been exceeded.

The check determines whether the time counted is greater than $t_{max}$

Step 113: If $t_{max}$ was not exceeded, the flag stays on "problem". As long as the flag is on "problem", suppression of the control circuit Step (Block) 113 occurs indicating that the measured values must not be used for calculating the command value.

Step 114: If the time $t_{max}$ is exceeded, then the process moves to Step (Block) 114 and a report is issued stating "trend calculation was wrong. Recalculate trend", in order to cover the possibility that the algorithm may not recognize the end of the problem and thus would forever remain in the false track, or in fact a machine problem occurred that cannot be corrected by the control algorithm.

Figure 4:
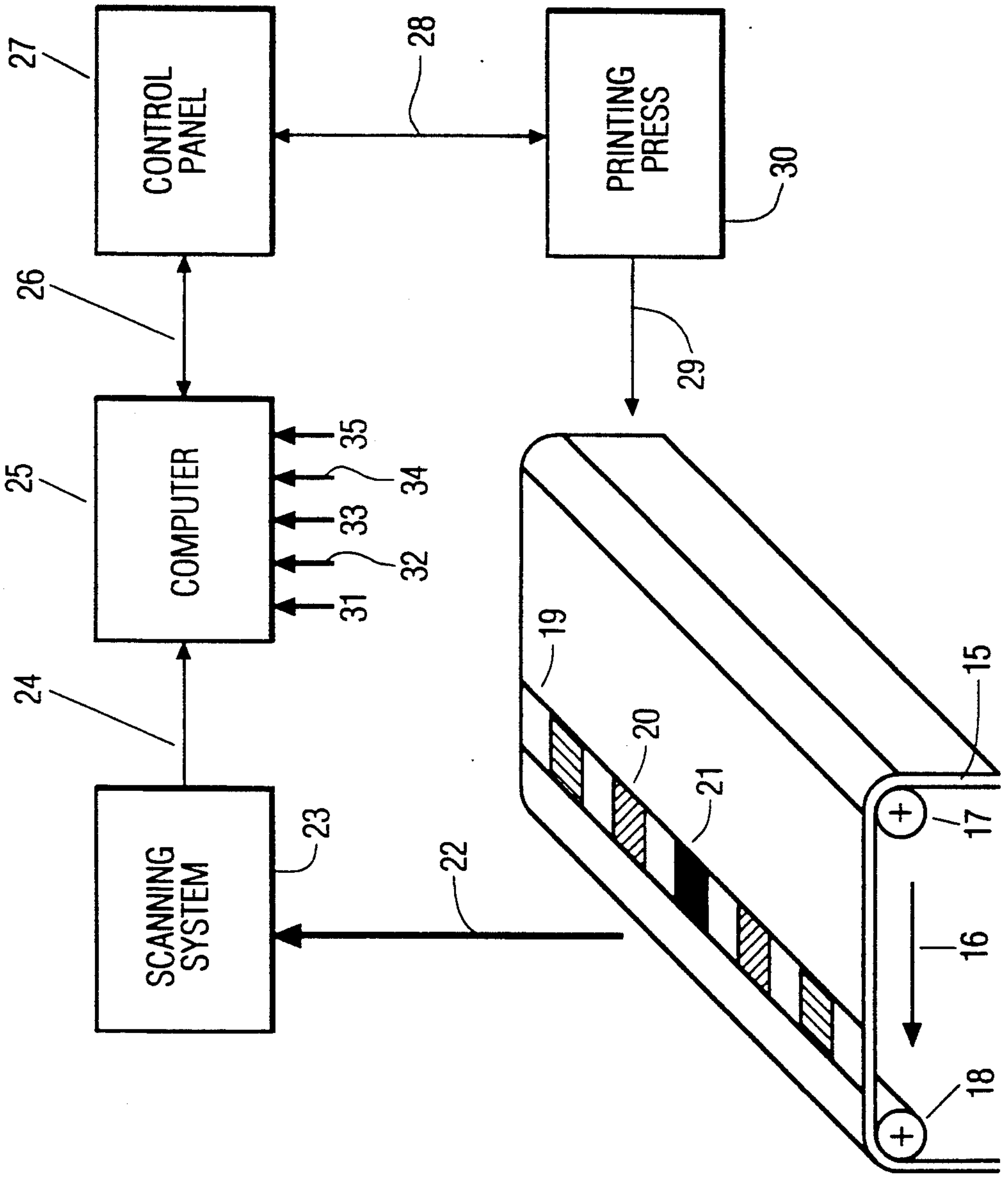
FIG. 4 is a block circuit diagram for a system for performing the method according to the invention

In FIG. 4, a system or apparatus is described that is suitable for performing the method according to the present invention. For a web 15 of material to be printed, which is moved in the direction of the arrow 16 and travels over paper guide rollers 17 and 18, the diffuse reflection of monitoring fields present in an ink or color monitoring strip 19, comprising half-tone areas 20 and full-tone areas 21, is calculated by a scanning system 23. The arrow 22 indicates the measuring procedure used by the measuring unit 23, in which the diffuse reflections are then further processed. Via lines or transmission channels suggested at 24, the processed measured values from the measurement unit 23 are supplied to a computer 25.

The computer 25 is also supplied with the status of various parameters. The computer ascertains the above-described variations in diffuse reflection of full-tone and half-tone areas of at least two fields of at least two successive printed copies or printed images, or those following one another at an interval, and from them calculates a diagnosis and/or control recommendations in accorance with the methods already described.

To further increase the reliability of the diagnosis, various data are supplied to the computer 25 via input channels 31-35 such as web tension data via the channel 31, ink slipping data via channel 32, the machine temperature via the channel 33, and ductor data via the channel 34.

Via information channels 26, the computer 25 furnishes recommendations for diagnosis and control to a control panel 27, on which suitable visual displays are provided. From panel 27, an operator, or in other words, a human printer, can cause the printing press 30 to respond via suitable control channels 28. Based on these adjustments, as indicated by arrow 29, the printing press will improve the printing or printed image and this can in turn be ascertained in subsequent copies in the applicable ink monitoring strips or test fields.

The method according to the invention and the system apparatus to perform this method can be used either with intervention by the printer or fully automatically, and the control panel and diagnostic computer may be identical to the hardware and software components thereof.

Various changes and modifications may be made, and any features described herein may be used with any of the others, within the scope of the inventive concept.

TABLE

| | |
|---|---|
| $\lvert G_R\rvert < GW_R(1)$ and $\lvert G_V\rvert < GW_V(1)$ | (1) |
| $GW_R(1) < \lvert R_R\rvert < GW_R(2)$ and $GW_V(1) < \lvert G_V\rvert < GW_V(2)$ | (2) |
| $G_R < -GW_R(2)$ and $G_V < -GW_V(2)$ | (3) |
| $GW_R(1) < G_R < GW_R(2)$ and $G_R >> G_V$ | (4) |
| $G_R > GW_R(2)$ and $G_R >> G_V$ | (5) |
| $G_{V/R} = R(K)_{V/R} - R(K-1)_{V/R}$ | (6) |
| $G_{diff} = G_R - G_V$ | (7) |

where:

- $G_R$: rate of variation, half-tone
- $G_V$: rate of variation, full-tone $GW_R$: limit value of rate of variation in half-tone $GW_V$: limit value of rate of variation in full-tone;

(1) and (2) are limit values obtained empirically p1 K: is the number of the current sheet counted from the onset of printing

We claim:

1. A method of preparing diagnoses for control of process parameters, including damping liquid metering, machine temperature, and blurring control, in a rotary printing press by detecting diffuse reflections of full-tone and half-tone fields, comprising the steps of detecting, by means of scanners integrated in the printing press, the diffuse reflections of said full-tone and half-tone fields during printing;

comparing said detected reflections for at least two succeeding copies, the respective diffuse reflections being derived from at least two selected fields of said copies, comprising at least one half-tone field and a full-tone fields of different area coverage;

deriving from said compared reflections, diagnostic and operational data relative to operation of said rotary printing press, wherein said comparison step includes sensing differences of diffused reflection between the full-tone fields and half-tone fields of said at least two succeeding copies or, respectively, the difference of diffused reflection between the half-tone fields of different area coverage of said at least two succeeding copies, and determining the relative relationship, optionally the difference, between the diffused reflections of the succeeding copies of at least one full-tone and half-tone field, or of the different area coverage reflections from said two half-tone fields, respectively, at corresponding measuring points in said succeeding copies.

2. A method according to claim 1, wherein: when blurring is to be sensed, the comparing step compares the rate of variation of the diffuse reflections of said half-tone areas with the diffuse reflections of said full-tone areas; and wherein in accordance with results ascertained from said comparing step, a diagnosis is made as to whether long-term blurring is occurring or brief blurring is occurring.

3. A method according to claim 1, wherein said diffuse reflections are measured spectrally, and wherein selected relationships of the various spectra to one another and, if required, selected relationships in the variation of various spectra, and of the spectra to one another, are determined.

4. A method according to claim 1, wherein said diffuse reflections are measured densiometrically 5. A method according to claim 1, wherein said diffuse reflections are measured colorimetrically.

6. A method according to claim 1, wherein said selected fields are jointly printed on a monitoring strip.

7. A method according to claim 1, wherein in said selected fields, at least some details of a subject being reproduced are used.

8. A method according to claim 1, wherein said full and half-tone diffuse reflections respectively have a limiting value for the rate of variation; and wherein during the initial printing phase said limiting values for said predetermined diffuse reflections are increased compared with the limit values during the continued printing phase.

9. A method according to claim 1, wherein said printing press is supplied with ink and damping fluid for individual colors; wherein the fluid balances of said ink and damping fluid are ascertained for said individual colors; and wherein the diffuse reflections of said full-tone fields are detected for said individual colors which are respectively ascertained at predetermined time intervals and then compared with said various diffuse reflections of said half-tone fields for said individual colors.

10. A method according to claim 1, further comprising the step of using said diagnostic data to control said process parameters to adjust said rotary printing press to operate within a normal or desired range.

11. A method according to claim 1, wherein said comparison step includes comparing said reflections of said at least two printed copies which follow one another in at least one of:

immediately following sequence;

spaced sequence.

12. A method according to claim 1, wherein said comparison step comprises sensing the rate of variation in said diffuse reflections in succeeding copies of said half-tone fields in relation to the diffuse reflections of said full-tone fields.

13. A method according to claim 12, wherein said printing press is supplied with ink and with damping fluid; wherein said rates of variation of said diffuse reflections are calculated during a predetermined interval of time, and wherein, if predetermined limit values for said rates of variation are exceeded, said control step operates to cut off, selectively, control of said supply of ink and said supply of damping fluid.

14. A method according to claim 1, wherein said comparing step includes preparing a trend analysis of said full and half-tone reflections from currently ascertained diffuse reflection values; comparing said first analysis with known and, if required, empirically ascertained relationships of said process parameters with said diffuse reflection values;

and extrapolating, from said comparison, predicted values which are used to recognize and differentiate subsequent process malfunctions.

15. A method according to claim 14, wherein said trend analysis uses diffuse reflections from the most recent n measured values of n copies; and wherein if predetermined deviations are exceeded, malfunctions are recognized and, if required, diagnoses are prepared.

16. A method according to claim 15, wherein said printing press includes ink supply control means and damping liquid control means and wherein upon determining that blurring is occurring said ink supply control means and said damping liquid control means are disabled.

17. A diagnostic system including monitoring operation of a rotary printing press, as copies are being made, and for control of process parameters of said printing press, said copies having full-tone and half-tone fields, comprising detection means for detecting the diffuse reflections of said full-tone and half-tone fields from a printed copy, and diffuse reflection from full-tone and half-tone fields from a reference copy, wherein said reflections are determined with respect to at least a half-tone and a full-tone field, or two half-tone fields of different area coverages, respectively, on said copies;

computing and machine operation control console means (25) connected to said detection means (23), said computing means being connected to receive inputs representative of printing machine operating data, including machine temperature, optionally web tension and tension variation data, inker control and ink supply position data, optionally ductor data, said computing and machine operation control console means including computer means deriving diagnostic and control data with respect to ink-/damping fluid balance, change in ink supply, and control of blurring, said computing and machine operation control console means further including comparison means for comparing the detected reflections of said printed copies for deriving said diagnostic and control data.

18. A diagnostic system according to claim 17, wherein said computing means operates in accordance with a control algorithm, said computer means computing and storing empirically ascertained relationships between the variations of said process parameters including ink metering, damping liquid metering and resulting changes in the diffuse reflections of said full-tone and said half-tone fields and determining relationships therebetween, said computing means, if required, calculating from statistically ascertained values of said process parameters and relationships obtained during an undisturbed printing interval, limit values for the accuracy of predictions based on the change which can be predicted for future malfunctions

19. A diagnostic system according to claim 17, wherein said computing means operates in accordance with a control algorithm for detecting blurring, said computing means calculating the rate of variation of full-tone and half-tone diffuse reflections and differences in said rate of variation, and wherein, if predetermined values are exceeded, said computing means indicates that "blurring" is occurring.

20. A diagnostic system according to claim 17, wherein said computing means operates in accordance with a control algorithm, wherein said computing means computes and stores empirically ascertained relationships between variations of said process parameters and resultant changes in the diffuse reflections of said full-tone and half-tone fields, and determines relationships therebetween, and wherein said computing means, if required, also calculates, from statistically ascertained values of said process parameters and relationships obtained during an undisturbed printing interval, values for the accuracy of predictions based on changes which can be predicted for future malfunctions.

21. A diagnostic system according to claim 19, wherein said process parameters include ink metering and damping liquid metering.

* * * * *